US011885463B2

(12) United States Patent
Kraus

(10) Patent No.: US 11,885,463 B2
(45) Date of Patent: Jan. 30, 2024

(54) PRESSURIZED GAS ACCUMULATOR, METHOD FOR PRODUCING A PRESSURIZED GAS ACCUMULATOR, AND DEVICE FOR CARRYING OUT THE METHOD

(71) Applicants: Audi AG, Ingolstadt (DE); Volkswagen AG, Wolfsburg (DE)

(72) Inventor: Maik Kraus, Magdeburg (DE)

(73) Assignees: Audi AG, Ingolstadt (DE); Volkswagen AG, Wolfsburg (DE)

( * ) Notice: Subject to any disclaimer, the term of this patent is extended or adjusted under 35 U.S.C. 154(b) by 66 days.

(21) Appl. No.: 16/965,566

(22) PCT Filed: Jan. 23, 2019

(86) PCT No.: PCT/EP2019/051565
§ 371 (c)(1),
(2) Date: Jul. 28, 2020

(87) PCT Pub. No.: WO2019/145327
PCT Pub. Date: Aug. 1, 2019

(65) Prior Publication Data
US 2021/0048146 A1 Feb. 18, 2021

(30) Foreign Application Priority Data
Jan. 29, 2018 (DE) ..................... 10 2018 201 254.7

(51) Int. Cl.
*F17C 1/06* (2006.01)
*F17C 1/16* (2006.01)

(52) U.S. Cl.
CPC .................. *F17C 1/06* (2013.01); *F17C 1/16* (2013.01); *F17C 2201/0109* (2013.01); *F17C 2203/066* (2013.01); *F17C 2209/2154* (2013.01); *F17C 2223/0123* (2013.01)

(58) Field of Classification Search
CPC ...... F17C 1/06; F17C 1/16; F17C 2201/0109; F17C 2203/066; F17C 2209/2154; F17C 2223/0123; F17C 2260/011; B65D 90/029
See application file for complete search history.

(56) References Cited

U.S. PATENT DOCUMENTS 2,376,831 A 5/1945 Stearns
2,744,043 A 5/1956 Ramberg
(Continued)

FOREIGN PATENT DOCUMENTS

DE 698 17 078 T2 5/2004
DE 10 2014 225 045 A1 9/2015
(Continued)

*Primary Examiner* — Shawn M Braden
(74) *Attorney, Agent, or Firm* — Seed IP Law Group LLP

(57) ABSTRACT

A pressurized gas accumulator has a hollow body which extends along a longitudinal axis and at least one connection piece. The hollow body has at least one layer of a weave structure with a plurality of warp threads running next to one another and a weft thread woven with the warp threads and oriented perpendicular thereto. The warp threads are oriented essentially parallel or essentially perpendicular to the longitudinal axis of the hollow body. A method for producing a pressurised gas accumulator and to a device for carrying out said method is also provided.

6 Claims, 2 Drawing Sheets

(56) References Cited

U.S. PATENT DOCUMENTS

| | | | | |
|---|---|---|---|---|
| 8,016,322 | B2 * | 9/2011 | Keehan | B61D 5/00 264/516 |
| 8,931,661 | B2 | 1/2015 | Kuroiwa et al. | |
| 2004/0089440 | A1 | 5/2004 | Sanders | |
| 2009/0314785 | A1 | 12/2009 | Cronin et al. | |
| 2010/0065192 | A1 | 3/2010 | Wilson et al. | |
| 2012/0012593 | A1 * | 1/2012 | Kuroiwa | F17C 1/16 220/660 |
| 2012/0024746 | A1 * | 2/2012 | Otsubo | F17C 1/06 156/187 |
| 2015/0102037 | A1 | 4/2015 | Nettis et al. | |
| 2015/0192251 | A1 * | 7/2015 | Tupper | B65D 25/14 156/196 |
| 2015/0361596 | A1 * | 12/2015 | Valérie | D02G 3/442 428/36.1 |
| 2015/0362125 | A1 | 12/2015 | Morales et al. | |

FOREIGN PATENT DOCUMENTS

| | | | |
|---|---|---|---|
| EP | 0 263 392 | A2 | 4/1988 |
| EP | 1 520 683 | A2 | 4/2005 |
| GB | 793247 | A | 4/1958 |
| JP | 2006-300139 | A | 11/2006 |

* cited by examiner

PRESSURIZED GAS ACCUMULATOR, METHOD FOR PRODUCING A PRESSURIZED GAS ACCUMULATOR, AND DEVICE FOR CARRYING OUT THE METHOD

BACKGROUND

Technical Field

Embodiments of the invention relate to a pressurized gas accumulator having a hollow body which extends along a longitudinal axis and has at least one connection piece, which hollow body has at least one layer of a weave structure having a plurality of warp threads running next to one another and at least one weft thread that is woven with the warp threads and is oriented essentially perpendicular thereto.

Embodiments of the invention also relate to a method for producing a pressurized gas accumulator having a hollow body which extends along a longitudinal axis and has at least one connection piece, and to a device for carrying out the method.

Description of the Related Art

Pressurized gas accumulators are known from US 2009/0314785 A1. This shows a pressurized gas accumulator which is surrounded by a plurality of different layers with different fiber orientations. A disadvantage here is that integrating different layers complicates the production of such a pressurized gas accumulator.

BRIEF SUMMARY

It is therefore an object of embodiments of the present invention to develop a pressurized gas accumulator of the type mentioned initially, a method for producing a pressurized gas accumulator and a device for carrying out the method in such a way that simpler production of the pressurized gas accumulator is made possible with simultaneously high load capacity.

In some embodiments, a pressurized gas accumulator includes warp threads oriented essentially parallel or essentially perpendicular to the longitudinal axis.

The main load on the pressurized gas accumulator occurs primarily in the radial direction as tangential tension and in the axial direction towards the longitudinal axis. A weave structure, on the other hand, has the highest load capacity in the fiber direction. The orientation of the warp threads essentially parallel or essentially perpendicular to the longitudinal axis, that is to say, in the direction of the main load on the pressurized gas accumulator, thus ensures a high load capacity of the pressurized gas accumulator. The parallel or perpendicular orientation of the warp threads relative to the longitudinal axis includes deviations in orientation within a few degrees, or up to an angle of 10°.

In one embodiment, it is provided for the warp threads to be arranged essentially parallel to one another. Furthermore, it is advantageous for the warp threads to be oriented perpendicular to the longitudinal axis of the hollow body and for the weft thread to be oriented parallel to the longitudinal axis of the hollow body. This enables simpler production. In an alternative embodiment, it is also possible for the warp threads to be oriented parallel to the longitudinal axis of the hollow body and for the weft thread to be oriented perpendicular to the longitudinal axis of the hollow body.

Furthermore, in an alternative embodiment, it is provided for the hollow body to have more than one, namely two connection pieces, for example a filling nozzle and a discharge nozzle, which may each be arranged at one end of the hollow body. This enables the simple filling of the pressurized gas accumulator, in particular if the pressurized gas accumulator is integrated into a motor vehicle as, for example, a fuel tank. The connection pieces may furthermore be formed as valves. The ends of the hollow body may be formed as domes.

Furthermore, it has proven to be advantageous if the hollow body is formed as a hollow cylinder or as a body similar to a hollow cylinder, and is formed from a composite material such as carbon fibers, glass fibers, aramid fibers or Wollaston wire, for example. This makes it possible to reduce the weight of the pressurized gas accumulator. The pressurized gas accumulator can be formed as a type V pressurized gas accumulator.

In an alternative embodiment, an additional hollow body is arranged on the inner circumferential side of the hollow body in order to form a type III or a type IV pressurized gas accumulator. The additional hollow body can be formed from metal (type III) or from a polymer (type IV).

In an embodiment, a width of the weave structure corresponds to at least one extent of the additional hollow body along the longitudinal axis. In this way, the hollow body can be completely formed by a layer of the weave structure. In an alternative embodiment, the width of the weave structure can also be smaller than the extent of the additional hollow body along the longitudinal axis.

To fix in place and reinforce the weave structure, in particular in the region of the domes, a diagonal thread woven diagonally with respect to the longitudinal axis with at least one of the warp threads is provided. A new fiber with an additional fiber orientation is introduced in the form of the diagonal thread. Combining a plurality of layers with different fiber orientations, as occurs, for example, in the process of winding, can thus be avoided. The diagonal thread may likewise be made of the above-mentioned fiber material. Warp threads, diagonal threads and weft threads can be made of different composite fiber materials or of the same composite fiber material.

In one embodiment, the diagonal thread can be designed as an alternating warp thread which is woven with at least a first and a second warp thread in a zig-zag shape. The design of the diagonal thread as an alternating warp thread enables the reinforcement to be adapted locally to particular load requirements. The diagonal thread can thus be introduced, for example, only in the region of one of the domes or in the region of both domes. The zig-zag pattern of the diagonal thread can be regular or irregular. One warp thread can be looped around one of the warp threads in one row and looped around another of the warp threads or around a plurality of the warp threads in the next row.

In an alternative embodiment, it is provided for the diagonal thread to be a diagonal weft thread which is woven in a zig-zag shape with at least one first and one second warp thread. This enables the additional reinforcement of the entire weave structure.

In a further alternative embodiment, it is provided that the weave structure has a plurality of diagonal threads which are formed as alternating warp threads and/or as diagonal weft threads.

In some embodiments, a method for producing a pressurized gas accumulator formed as a hollow body with a rotationally symmetrical base body extending along a longitudinal axis comprises:

a. Forming a weave structure by means of a weaving device, wherein the weave structure has a plurality of warp threads running next to one another and a weft thread woven with and arranged essentially perpendicular to the warp threads and b. Laying down and/or winding the weave structure around the rotationally symmetrical base body, such that the warp threads are oriented essentially parallel or essentially perpendicular to the longitudinal axis of the rotationally symmetrical base body.

In some embodiments, a method described herein greatly simplifies production of the pressurized gas accumulator, since layering different layers with different fiber orientation over each other can be dispensed with. The orientation of the warp threads and the weft thread parallel or perpendicular to the longitudinal axis of the rotationally symmetrical base body simultaneously achieves a high load capacity of the pressurized gas accumulator. Moreover, in some embodiments, a method enables a plurality of warp threads to be laid down simultaneously and the warp threads and the weft thread to be laid down while dry.

In order to simplify the production process, it is particularly advantageous if the warp threads are arranged essentially parallel to one another.

In order to improve the load capacity of the pressurized gas accumulator, the weave structure may be wound around the rotationally symmetrical base body in a plurality of layers, that is to say, several times.

In one embodiment, in order to form a type V pressurized gas accumulator, it is provided for the rotationally symmetrical base body to be removed from the hollow body produced by the laying down and/or winding. This can be done, for example, in that the rotationally symmetrical base body is formed as a tube or as a balloon which is inflated or filled with a liquid during laying down and/or winding in such a way that the geometry desired for the hollow body is formed by the tube/balloon. After laying down and/or winding, the air or the liquid escapes and the hose can be pulled out of the hollow body.

In an alternative embodiment, to form a type III or type IV pressurized gas accumulator, the rotationally symmetrical base body is designed as an intermediate hollow body and remains in the woven hollow body.

In order to reinforce the weave structure and to obtain even better adjustment of the orientation of the warp threads along a given container geometry, the method may additionally comprise:

Introducing or forming at least one diagonal thread which is woven diagonally with respect to the longitudinal axis with at least one of the warp threads.

In an alternative embodiment, it is also possible for a plurality of diagonal threads to be introduced for further reinforcement.

In one embodiment, the diagonal thread is formed in the weave structure by wrapping one of the warp threads around at least one other of the warp threads. Local reinforcements, that is to say, reinforcements which reinforce only a subregion of the weave structure, can be introduced in a simple manner by means of this bobbin principle.

Alternatively or additionally, the weft thread is introduced by sequentially guiding a second weft thread diagonally to the longitudinal axis. This enables the reinforcement of the entire weave structure.

For better laying down and/or winding of the weave structure about the rotationally symmetrical base body in the region of the at least one dome, it is possible for a translational relative movement to take place along the longitudinal axis between the weaving device and the rotationally symmetrical base body. It can be provided for either the weaving device to move relative to the rotationally symmetrical base body or for the rotationally symmetrical base body to move relative to the weaving device.

It may furthermore be provided that the method comprises the step, following at least step b., of:

Coating the wound hollow body with a matrix material and in particular gas-tight sealing of the hollow body.

The load capacity of the pressurized gas accumulator is thereby further increased by adhesive bonding of the threads to one another. The weave structure is simultaneously sealed. The matrix material may be a resin or a liquid plastic with adhesive properties. After coating, the matrix material is cured by means of a reaction, for example, by applying heat.

In order to form the contour of the hollow body, in particular at its dome, and in order to achieve a correspondingly precise thread pre-tensioning, the warp threads may be braked. This can be done, for example, by a thread brake. Alternatively, the warp threads can also be braked by controlling the unrolling behavior of the spools of the weaving device holding the warp threads. A looser weave structure is achieved in this way.

In some embodiments, a device for carrying out the method has a winding device for wrapping a rotationally symmetrical base body with a weave structure which has a plurality of warp threads and a weft thread which in at least sections is essentially perpendicular to the warp threads, wherein the rotationally symmetrical base body extending along a longitudinal direction is wrapped with the weave structure by means of a rotational relative movement between the rotationally symmetrical base body and the weave structure, such that the warp threads are oriented essentially parallel or essentially perpendicular to the longitudinal axis of the rotationally symmetrical base body. The device enables the simple production of a robust pressurized gas accumulator by three-dimensional or spherical weaving of a weave structure and by laying down and/or winding the weave structure around the rotationally symmetrical base body. In one embodiment, the rotationally symmetrical base body can be formed as a tube or balloon filled with gas or a liquid. In an alternative embodiment, the rotationally symmetrical base body is formed as a hollow-cylindrical or hollow-cylindrical-like intermediate hollow body, the two open ends of which are formed as domes and each have a connection piece.

The device may have a roller from which the prefabricated weave structure can be unrolled. The roller is positioned with respect to the rotationally symmetrical base body in such a way that the warp threads can be fastened to and/or wound on the rotationally symmetrical base body perpendicular or parallel to the longitudinal axis.

In an alternative embodiment, the device comprises a weaving device for weaving the weave structure.

BRIEF DESCRIPTION OF THE SEVERAL VIEWS OF THE DRAWINGS

Additional advantages, features and details arise from the claims, the following description and on the basis of the drawings. The following are shown:

DETAILED DESCRIPTION

Figure 1:
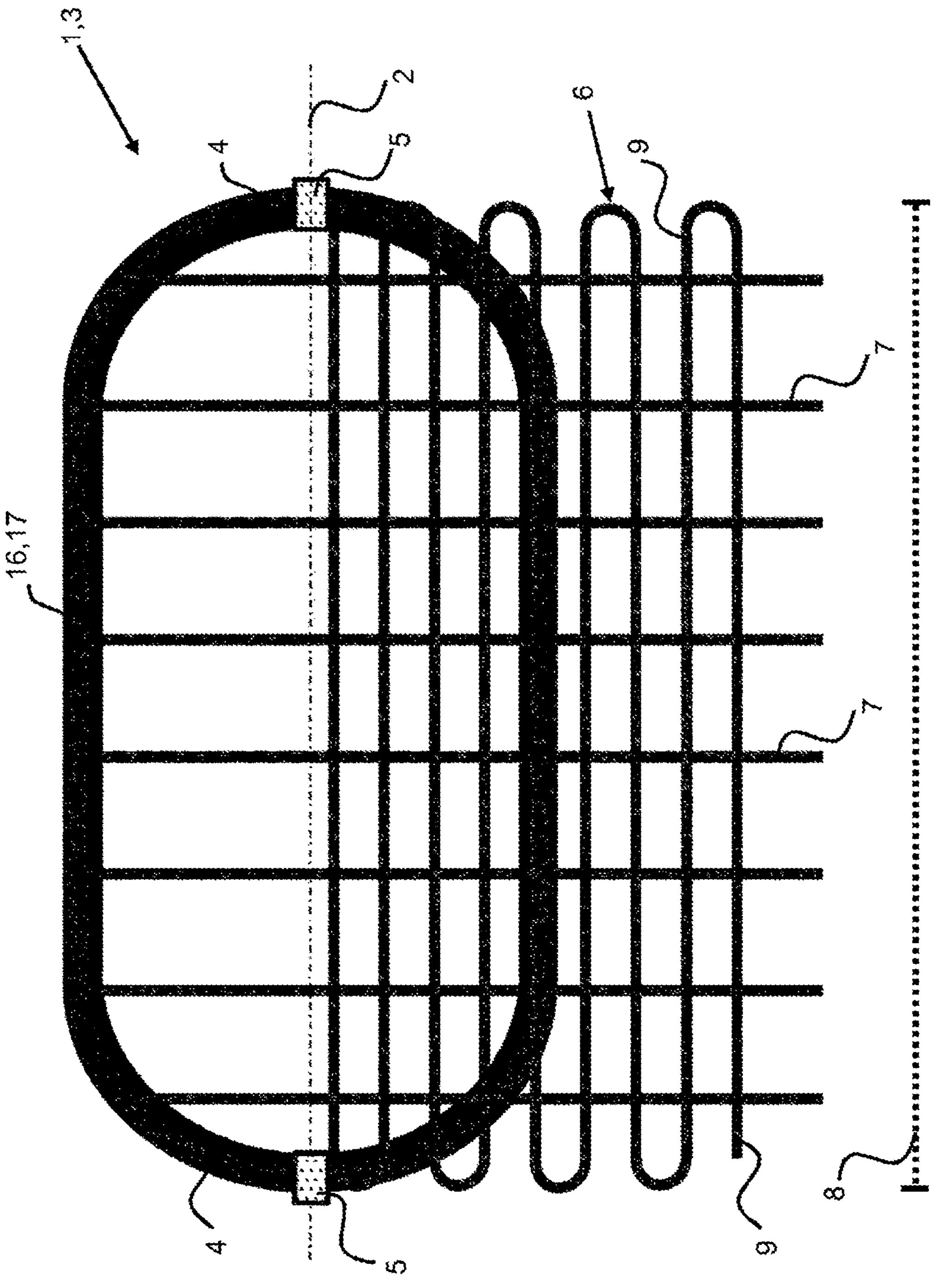
FIG. 1 illustrates a schematic representation of a pressurized gas accumulator with warp threads oriented perpendicular to the longitudinal axis and a weft thread formed parallel to the longitudinal axis.

FIG. 1 shows a schematic representation of a pressurized gas accumulator 1 of type III or type IV formed as a hollow body 3 and in the process of being produced. A hollow-cylindrical intermediate hollow body 16 which extends along a longitudinal axis 2 is arranged on the inner circumference of the hollow body 3. A dome 4 with a connection piece 5 for filling and removing a fluid is formed at each of its two open ends. The hollow body 3 has a weave structure 6 with a plurality of warp threads 7 arranged parallel to one another and with a weft thread 9 woven with the warp threads 7 and, at least in sections, oriented essentially perpendicular thereto. The warp threads 7 are oriented essentially perpendicular to the longitudinal axis 2 and thus perpendicular to the longitudinal axis 2 of the intermediate hollow body 16.

A width 8 of the weave structure 6 corresponds to at least one extent of the intermediate hollow body 16 along the longitudinal axis 2, such that a wrapping of the weave structure 6 around the intermediate hollow body 16—that is to say, a layer—almost completely surrounds it. In the present exemplary embodiment, the warp threads 7 are arranged at regular intervals from one another. In an alternative embodiment, the distance between the individual warp threads 7 can vary as a function of the pressure conditions which are present later in the filled accumulator.

A weft thread 9 is woven with the warp threads 7 parallel to the longitudinal axis 2. The weft thread 9 forms a mesh structure with the warp thread 7, wherein the weft thread 9 forms a plurality of interconnected rows woven with the warp threads 7 and the warp threads 7 are arranged in columns. In an alternative embodiment, the weave structure 6 may also comprise a plurality of weft threads 9.

The load capacity of the pressurized gas accumulator 1 is increased by orienting the warp threads 7 perpendicular to the longitudinal axis 2. This is related to the fact that the main load in a cylindrical pressurized gas accumulator 1 is in the radial direction and in the axial direction with respect to the longitudinal axis 2. The maximum load capacity of a weave structure 6, however, is in the fiber direction, which is oriented in the direction of the highest load on the pressurized gas accumulator 1 in the weave structure 6.

The pressurized gas accumulator 1 according to FIG. 1 is produced by the following method: in the present exemplary embodiment, the intermediate hollow body 16 serves as a rotationally symmetrical base body 17 of a winding device, not shown in further detail. The warp threads 7 are arranged on the rotationally symmetrical base body 17 in such a way that they run essentially perpendicular to the longitudinal axis 2. A shed is formed by spreading the warp threads 7. The weft thread 9 is woven with the warp threads 7 by passing it through the shed in a first direction, such that the weft thread is arranged essentially parallel to the longitudinal axis 2 and essentially perpendicular to the warp threads 7. In a next step, the weft thread 9 is passed through the shed opposite to the first direction. The weft thread 9 is passed through the shed until the weave structure has the desired length.

The laying down and/or winding of the weave structure 6 around the rotationally symmetrical base body 17 takes place in that the rotationally symmetrical base body 17 rotates about its longitudinal axis 2. The weave structure 6 is unwound via a roller, not shown in further detail, and guided to the rotationally symmetrical base body 17. It is laid down and/or wound in such a way that the warp threads 7 are oriented perpendicular to the longitudinal axis 2 of the rotationally symmetrical base body 17. In particular, the rotationally symmetrical base body 17 is wrapped multiple times. In one embodiment, the laying down and/or winding and the forming of the weave structure 6 take place simultaneously at least some of the time.

In an alternative embodiment, a tube, a balloon, a metal body or the like serve as the rotationally symmetrical base body 17. A tube or balloon is either inflated or filled with a liquid so as to form the desired geometry for the pressured gas accumulator 1. Subsequently, the warp threads 7 are detachably fastened to the rotationally symmetrical base body 17 in such a way that they are oriented essentially perpendicular to the longitudinal axis 2. Weaving and laying down and/or winding take place as described above. Following the laying down and/or winding process, the rotationally symmetrical base body 17 is removed from the wrapped hollow body 3.

In a further alternative embodiment, the weave structure 6 can also be formed first in a weaving device and then the finished weave structure 6 can be oriented on the rotationally symmetrical base body 17 in such a way that the warp threads 7 are oriented essentially perpendicular to the longitudinal axis 2 of the rotationally symmetrical base body 17. Furthermore, the weave structure 6 is oriented on the rotationally symmetrical base body 17 in such a way that its edges end at the ends of the rotationally symmetrical base body 17 formed as domes 4.

Following the laying down and/or winding of the rotationally symmetrical base body 17, the wrapped hollow body 3 is coated with a matrix material, which may be made of resin or liquid plastic, and hardened by means of application of heat, such that the fibers are glued together and the hollow body 3 is sealed.

Figure 2:
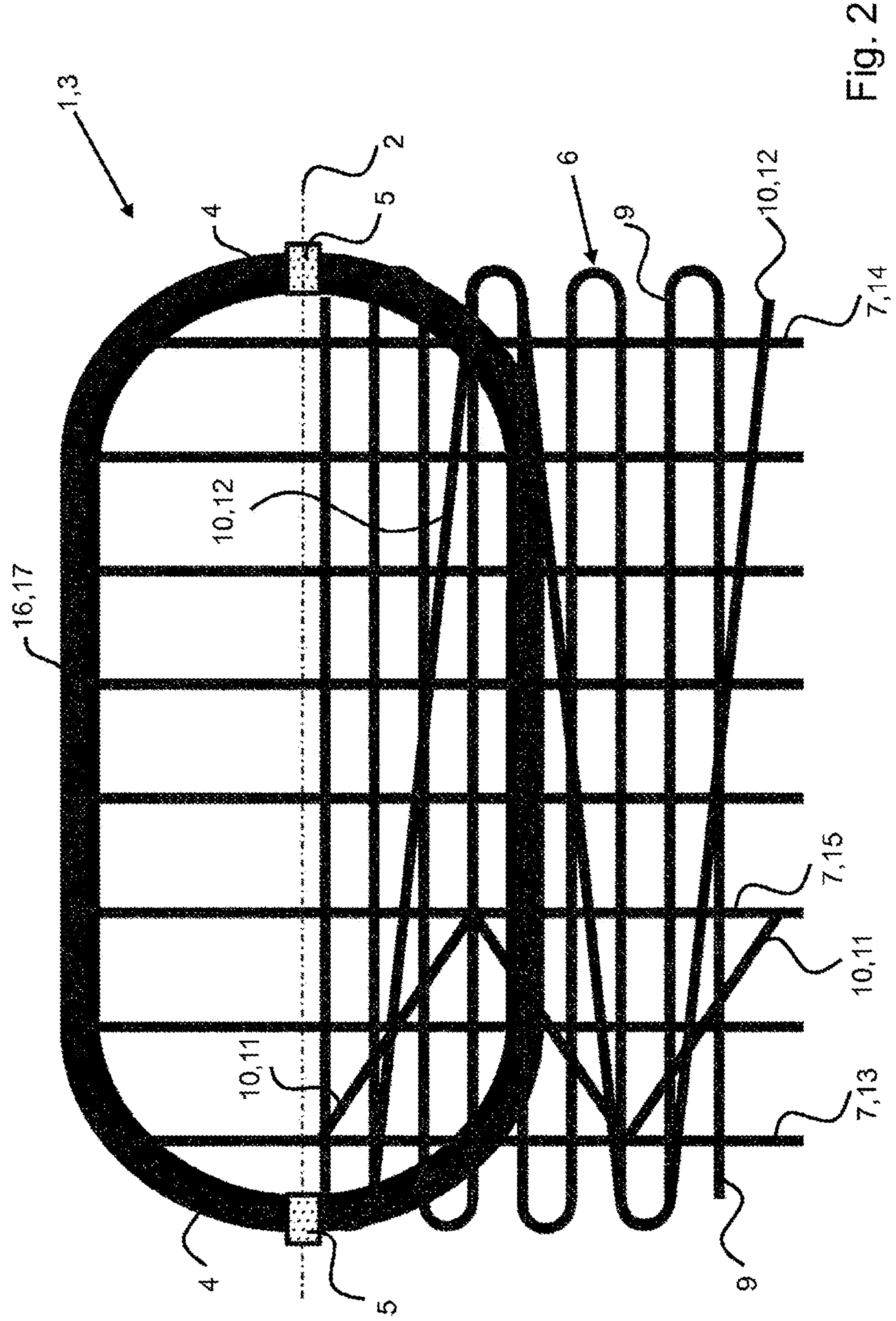
FIG. 2 illustrates a schematic representation of a pressurized gas accumulator with additionally introduced diagonal threads.

FIG. 2 shows an alternative embodiment of the pressurized gas accumulator 1. The weave structure 6 has two diagonal threads 10 which are diagonally woven with respect to the longitudinal axis 2 with at least one of the warp threads 7 in each case. A first diagonal thread 10 is designed as an alternating warp thread 11 which is woven in a zig-zag shape with at least one first and one second warp thread 7. The design of the diagonal threads 10 as alternating warp threads 11 is advantageous in the region of the domes 4 of the rotationally symmetrical base body 17. This enables the better adaptation of the fiber direction to the given container geometry. In the present exemplary embodiment, the alternating warp thread 11 is formed as a regular zig-zag pattern; i.e., the alternating warp thread 11 is alternately looped around the same warp threads 7 at regular intervals. In an alternative embodiment, the alternating warp thread 11 can also form an irregular zig-zag pattern.

The present embodiment further comprises a second diagonal thread 10 which is formed as a diagonal weft thread 12 which is woven in a zig-zag shape with a first edge warp thread 13 and a second edge warp thread 14 arranged at the edges of the weave structure 6. The diagonal weft thread 12 likewise forms a regular zig-zag pattern, but in an alternative embodiment it can also form an irregular zig-zag pattern. The whole weave structure 6 is reinforced by the introduction of the diagonal weft thread 12. The weave structure 6 can have any number of diagonal threads 10 which are formed as alternating warp threads 11 and/or as diagonal weft threads 12.

The method of producing the pressurized gas accumulator 1 is carried out as described above, wherein the diagonal threads 10 are additionally introduced into the weave structure 6. The introduction of the diagonal threads 10 takes place as follows: The alternating warp thread 11 is introduced by wrapping one of the warp threads 7 around another warp thread 15 and a further warp thread, in the present exemplary embodiment the first edge warp thread 13. By means of this bobbin principle, a zig-zag-shaped structure is formed at the edge region of the alternating warp thread 11 and thus in the region of the dome 4. Similarly, such zig-zag-shaped structures can also be formed in the middle of the weave structure 6 or along the entire width 8 of the weave structure 6. The weave structure 6 can thus be adapted individually to the geometric and load-related requirements of the hollow body 3.

The diagonal weft thread 12 is introduced by sequentially guiding a second weft thread 9 through the shed diagonally to the longitudinal axis 2 of the rotationally symmetrical base body 17.

Adaptation of the contour of the weave structure 6 to the given container geometry can be improved by adapting the weave structure 6, for example, in the region of the domes 4. This can be achieved by moving the warp threads 7 more slowly when the weave structure 6 is being formed, that is to say, by braking, for example, by a thread brake. Alternatively, it is possible to control the unrolling behavior of the spools of the weaving device on which the warp threads 7 are wound accordingly. In an alternative embodiment, it is also possible to adjust the length of the warp threads 7, that is to say, to shorten them, for example, in the region of the domes 4. The weaving and/or winding speed can also be adjusted.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pressurized gas accumulator, comprising:

a hollow body extending along a longitudinal axis and having at least one connection piece;

wherein the hollow body has at least one layer of a weave having:

a plurality of warp threads running next to one another, wherein the warp threads are oriented essentially parallel to or essentially perpendicular to the longitudinal axis of the hollow body;

a weft thread interwoven with the warp threads and oriented essentially perpendicular to the warp threads; and a diagonal thread interwoven with at least one of the plurality of warp threads, wherein the diagonal thread extends diagonally with respect to the longitudinal axis, and wherein the diagonal thread is not one of the plurality of warp threads and is not the weft thread.

2. The pressurized gas accumulator according to claim 1, wherein the diagonal thread is interwoven transversely across the layer of the weave.

3. The pressurized gas accumulator according to claim 2, wherein the diagonal thread is interwoven in a zig-zag shape with at least one first and one second warp thread.

4. The pressurized gas accumulator according to claim 1, wherein the hollow body is a rotationally symmetric hollow body.

5. The pressurized gas accumulator according to claim 1, wherein the hollow body includes a hollow cylinder.

6. The pressurized gas accumulator according to claim 1, wherein the warp threads, the weft thread, and the diagonal thread are made of different materials.

* * * * *